(12) United States Patent
Adachi et al.

(10) Patent No.: US 11,802,224 B2
(45) Date of Patent: Oct. 31, 2023

(54) ADHESIVE TAPE, METHOD FOR FIXING ELECTRONIC DEVICE COMPONENT OR ON-BOARD DEVICE COMPONENT, AND METHOD FOR PRODUCING ELECTRONIC DEVICE OR ON-BOARD DEVICE

(71) Applicant: SEKISUI CHEMICAL CO., LTD., Osaka (JP)

(72) Inventors: Aya Adachi, Osaka (JP); Yudai Ogata, Osaka (JP); Noriyuki Uchida, Shiga (JP); Yoshito Arai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 18/019,364

(22) PCT Filed: Mar. 22, 2022

(86) PCT No.: PCT/JP2022/013035
§ 371 (c)(1),
(2) Date: Feb. 2, 2023

(87) PCT Pub. No.: WO2022/202774
PCT Pub. Date: Sep. 29, 2022

(65) Prior Publication Data
US 2023/0212442 A1    Jul. 6, 2023

(30) Foreign Application Priority Data
Mar. 22, 2021  (JP) ................................. 2021-047311

(51) Int. Cl.
*C09J 133/12*  (2006.01)
*C09J 11/08*  (2006.01)

(52) U.S. Cl.
CPC ............. *C09J 133/12* (2013.01); *C09J 11/08* (2013.01); *C09J 2203/326* (2013.01);
(Continued)

(58) Field of Classification Search
CPC .... C09J 133/12; C09J 11/08; C09J 2203/326; C09J 2301/312; C09J 2301/408;
(Continued)

(56) References Cited

U.S. PATENT DOCUMENTS

| 2010/0151241 A1 | 6/2010 | Hardy et al. |
| 2012/0171915 A1 | 7/2012 | Bartholomew et al. |

(Continued)

FOREIGN PATENT DOCUMENTS

| CN | 112226164 | 1/2021 |
| EP | 2 626 397 | 8/2013 |

(Continued)

OTHER PUBLICATIONS

International Search Report dated Feb. 22, 2021 in International (PCT) Patent Application No. PCT/JP2020/047202.
(Continued)

*Primary Examiner* — Daniel H Lee
(74) *Attorney, Agent, or Firm* — Wenderoth, Lind & Ponack, L.L.P.

(57) ABSTRACT

The present invention aims to provide an adhesive tape that is easily peelable while capable of maintaining high adhesion at high temperature. The present invention also aims to provide a method for fixing an electronic device component or an in-vehicle device component using the adhesive tape and a method for producing an electronic device or an in-vehicle device. Provided is an adhesive tape including an adhesive layer containing: an acrylic copolymer; and 0.01 parts by weight or more and 10 parts by weight or less of a compound having a structure represented by the following formula (A) or (B) relative to 100 parts by weight of the acrylic copolymer:

(Continued)

[Chem. 1]

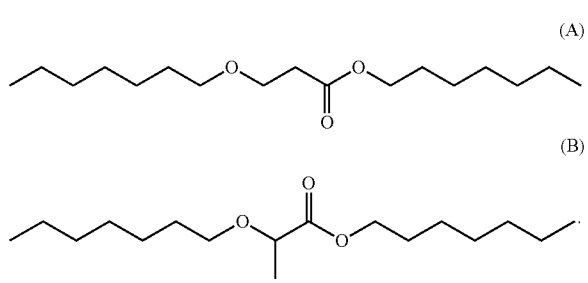

17 Claims, 1 Drawing Sheet

(52) U.S. Cl.
CPC .... *C09J 2301/312* (2020.08); *C09J 2301/408* (2020.08); *C09J 2301/414* (2020.08)

(58) Field of Classification Search
CPC .... C09J 2301/414; C09J 2433/00; C09J 5/00; C09J 7/10; C09J 7/385; C09J 133/08; C09J 11/06; C09J 133/10; C08F 220/1807; C08F 220/1804; C08K 5/10; C08K 5/101
See application file for complete search history.

(56) References Cited

U.S. PATENT DOCUMENTS

| | | | |
|---|---|---|---|
| 2012/0225983 A1* | 9/2012 | Wagner | C09J 11/06 524/296 |
| 2014/0024754 A1* | 1/2014 | Becker | C08K 5/1535 549/485 |
| 2018/0037783 A1 | 2/2018 | Talamoni et al. | |
| 2019/0048132 A1* | 2/2019 | Lundmark | C08G 63/13 |

FOREIGN PATENT DOCUMENTS

| | | |
|---|---|---|
| JP | 56-125471 | 10/1981 |
| JP | 58-46236 | 10/1983 |
| JP | 7-70534 | 3/1995 |
| JP | 8-209086 | 8/1996 |
| JP | 10-231325 | 9/1998 |
| JP | 2002-121522 | 4/2002 |
| JP | 2002-129122 | 5/2002 |
| JP | 2006-521418 | 9/2006 |
| JP | 2008-50563 | 3/2008 |
| JP | 2009-294573 | 12/2009 |
| JP | 2010-506979 | 3/2010 |
| JP | 2011-105829 | 6/2011 |
| JP | 2013-510200 | 3/2013 |
| JP | 2013-249322 | 12/2013 |
| JP | 2014-37543 | 2/2014 |
| JP | 2014-512342 | 5/2014 |
| JP | 2015-21067 | 2/2015 |
| JP | 2015-52050 | 3/2015 |
| JP | 2015-120876 | 7/2015 |
| JP | 2015-212326 | 11/2015 |
| JP | 2017-2225 | 1/2017 |
| JP | 2017-179329 | 10/2017 |
| JP | 2018-87334 | 6/2018 |
| JP | 2018-130934 | 8/2018 |
| JP | 2018-154832 | 10/2018 |
| JP | 2020-111741 | 7/2020 |
| KR | 10-2015-0010646 | 1/2015 |
| PL | 219947 | 4/2012 |
| WO | 2005/068521 | 7/2005 |
| WO | 2008/046000 | 4/2008 |
| WO | 2013/005470 | 1/2013 |

OTHER PUBLICATIONS

International Search Report dated Jun. 21, 2022 in International Application No. PCT/JP2022/013048.
International Search Report dated Jun. 21, 2022 in International Application No. PCT/JP2022/013035.

* cited by examiner

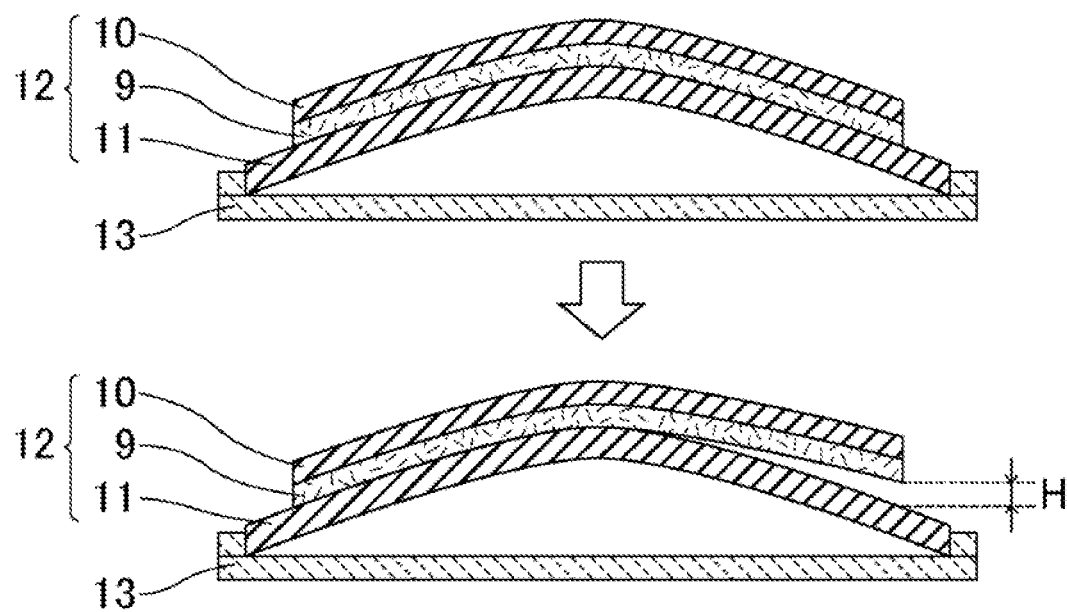

ADHESIVE TAPE, METHOD FOR FIXING ELECTRONIC DEVICE COMPONENT OR ON-BOARD DEVICE COMPONENT, AND METHOD FOR PRODUCING ELECTRONIC DEVICE OR ON-BOARD DEVICE

TECHNICAL FIELD

The present invention relates to an adhesive tape, a method for fixing an electronic device component or an in-vehicle device component, and a method for producing an electronic device or an in-vehicle device.

BACKGROUND ART

Adhesive tapes including an adhesive layer containing an adhesive such as an acrylic adhesive have been widely used to fix components in electronic devices, vehicles, houses, and building materials (see Patent Literatures 1 to 3, for example). Specifically, for example, adhesive tapes are used to bond a cover panel for protecting a surface of a portable electronic device to a touch panel module or display panel module, or to bond a touch panel module to a display panel module.

CITATION LIST

Patent Literature

Patent Literature 1: JP 2015-052050 A
Patent Literature 2: JP 2015-021067 A
Patent Literature 3: JP 2015-120876 A

SUMMARY OF INVENTION

Technical Problem

With the increase in environmental awareness in recent years, adhesive tapes easily peelable for recycling (disassembly) of electronic devices and the like are needed. Easy peelability may be achieved by, for example, increasing the degree of crosslinking (gel fraction) of the adhesive layer. However, adhesive tapes designed to have weaker adhesion by increasing the degree of crosslinking (gel fraction) of the adhesive layer may have lower adhesion than necessary in high-temperature environments, causing problems due to peeling of the adhesive tape when electronic devices and the like are exposed to high temperature. Especially when attached to steps, corners, or non-flat portions, adhesive tapes are attached in a deformed state and thus exert a force that tends to return them to their original shapes (also referred to as "restoring force" or "repulsive force"). This makes peeling more likely to occur at high temperature. Moreover, when a component is fixed in a deformed state, the component itself tends to return to its original shape, thus exerting a restoring force on the adhesive tape. This makes peeling even more likely to occur at high temperature.

The present invention aims to provide an adhesive tape that is easily peelable while capable of maintaining high adhesion at high temperature. The present invention also aims to provide a method for fixing an electronic device component or an in-vehicle device component using the adhesive tape and a method for producing an electronic device or an in-vehicle device.

Solution to Problem

The present invention relates to an adhesive tape including an adhesive layer containing: an acrylic copolymer; and 0.01 parts by weight or more and 10 parts by weight or less of a compound having a structure represented by the following formula (A) or (B) relative to 100 parts by weight of the acrylic copolymer.

The present invention is described in detail below.

[Chem. 1]

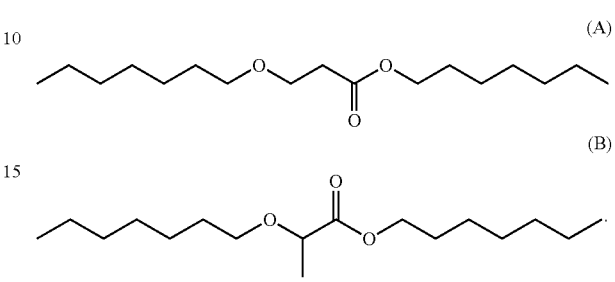

The present inventors have found out that adding a predetermined amount of a specific compound to an adhesive layer containing an acrylic copolymer enables production of an adhesive tape that is easily peelable while capable of maintaining high adhesion at high temperature. The inventors thus completed the present invention.

The adhesive tape of the present invention includes an adhesive layer containing an acrylic copolymer and 0.01 parts by weight or more and 10 parts by weight or less of a compound having a structure represented by the following formula (A) or (B) relative to 100 parts by weight of the acrylic copolymer.

[Chem. 2]

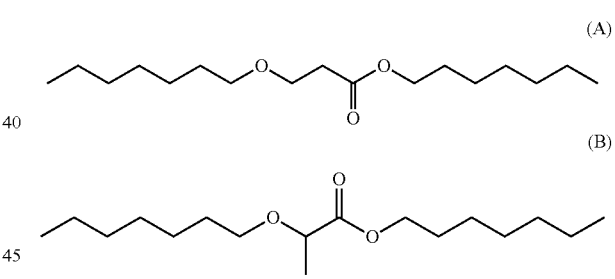

With the adhesive layer containing the compound having a structure represented by the formula (A) or (B) in an amount within the above range, the adhesive tape of the present invention is easily peelable while capable of maintaining high adhesion at high temperature. The reason for this is not clear. Presumably, the compound having a structure represented by the formula (A) or (B) bleeds out on the surface of the adhesive layer and thus facilitates interfacial peeling of the adhesive layer when the adhesive tape is peeled off. Additionally, the compound having a structure represented by the formula (A) or (B) is less likely to phase-separate from the acrylic copolymer even when it has bled out on the surface of the adhesive layer. This presumably allows the adhesive tape to maintain high adhesion at high temperature.

When the amount of the compound having a structure represented by the formula (A) or (B) is 0.01 parts by weight or more, the adhesive tape is sufficiently easily peelable. When the amount of the compound having a structure represented by the formula (A) or (B) is 10 parts by weight or less, the adhesive tape has sufficiently high adhesion particularly at high temperature. The lower limit of the amount of the compound having a structure represented by the formula (A) or (B) relative to 100 parts by weight of the acrylic copolymer is preferably 0.05 parts by weight. The upper limit thereof is preferably 8 parts by weight, and the lower limit is more preferably 0.1 parts by weight. The upper limit is more preferably 5 parts by weight.

The compound having a structure represented by the formula (A) or (B) may be a compound having a structure represented by the formula (A) or a compound having a structure represented by the formula (B), as long as it contains at least one of these compounds. The compound having a structure represented by the formula (A) or (B) encompasses a mixture of a compound having a structure represented by the formula (A) and a compound having a structure represented by the formula (B).

The method for producing the compound having a structure represented by the formula (A) or (B) is not limited. For example, the compound can be produced by addition reaction of n-heptyl acrylate with n-heptyl alcohol.

The acrylic copolymer is not limited. The acrylic copolymer preferably contains a structural unit derived from an alkyl (meth)acrylate, more preferably a structural unit derived from n-heptyl (meth)acrylate, among structural units derived from an alkyl (meth)acrylate.

Herein, (meth)acrylate means acrylate or methacrylate, and (meth)acrylic means acrylic or methacrylic. An acrylic copolymer may be a methacrylic copolymer.

When the acrylic copolymer contains the structural unit derived from n-heptyl (meth)acrylate, the adhesive tape has higher adhesion particularly at high temperature.

The reason for this is not clear. One possible reason is that since the n-heptyl group of n-heptyl (meth)acrylate is linear, the acrylic copolymer containing the structural unit derived from n-heptyl (meth)acrylate increases the cohesive force of the adhesive layer, thus increasing peel resistance. Another possible reason is that the acrylic copolymer containing the structural unit derived from n-heptyl (meth)acrylate has a decreased glass transition temperature (Tg) and also allows the adhesive layer to have a decreased storage modulus at room temperature and improved conformability to irregularities. Hydrocarbons having odd carbon numbers tend to have low melting points because their molecules are less likely to pack together than the molecules of hydrocarbons having even carbon numbers. Linear n-heptyl groups, having an odd carbon number, are similarly less likely to pack together. Another possible reason is therefore that the acrylic copolymer containing the structural unit derived from n-heptyl (meth)acrylate is less likely to cause packing of side chains, and thus easily exhibits flexibility, improving the conformability of the adhesive layer to irregularities.

When the adhesive layer contains the compound having a structure represented by the formula (A) or (B) in an amount within the above range and also the acrylic copolymer contains the structural unit derived from n-heptyl (meth) acrylate, the adhesive tape of the present invention is more easily peelable while capable of maintaining high adhesion at high temperature. This is presumably because the compound having a structure represented by the formula (A) or (B) has good compatibility with the acrylic copolymer containing the structural unit derived from n-heptyl (meth) acrylate, and thus the compound having a structure represented by the formula (A) or (B) is less likely to bleed out at the interface between the adhesive layer and an adherend even at high temperature.

The n-heptyl (meth)acrylate of the structural unit derived from n-heptyl (meth)acrylate may be n-heptyl acrylate or n-heptyl methacrylate, preferably n-heptyl acrylate.

The n-heptyl (meth)acrylate of the structural unit derived from n-heptyl (meth)acrylate may be petroleum-derived n-heptyl (meth)acrylate or bio-derived n-heptyl (meth) acrylate.

The structural unit derived from n-heptyl (meth)acrylate in which the n-heptyl (meth)acrylate contains bio-derived n-heptyl (meth)acrylate is preferred to save petroleum resources and reduce carbon dioxide emissions.

The bio-derived n-heptyl (meth)acrylate can be synthesized by esterifying (meth)acrylic acid with bio-derived n-heptyl alcohol. The bio-derived n-heptyl alcohol can be obtained by cracking raw materials collected from animals or plants (e.g., castor oil-derived ricinoleic acid).

The amount of the structural unit derived from an alkyl (meth)acrylate in the acrylic copolymer is not limited. The lower limit thereof is preferably 30% by weight, more preferably 48% by weight. The amount of the structural unit derived from an alkyl (meth)acrylate is still more preferably more than 50% by weight. The lower limit is further preferably 60% by weight, still further preferably 70% by weight, even still further preferably 80% by weight.

The upper limit of the amount of the structural unit derived from an alkyl (meth)acrylate is not limited. The upper limit is preferably 99% by weight, more preferably 97% by weight. In other words, the amount of the structural unit derived from an alkyl (meth)acrylate in the acrylic copolymer is preferably 30% by weight or more and 99% by weight or less.

The amount of the structural unit derived from n-heptyl (meth)acrylate in the acrylic copolymer is not limited. The lower limit thereof is preferably 30% by weight. When the amount of the structural unit derived from n-heptyl (meth) acrylate is 30% by weight or more, the adhesive tape has higher adhesion particularly at high temperature. The lower limit of the amount of the structural unit derived from n-heptyl (meth)acrylate is more preferably 48% by weight. The amount of the structural unit derived from n-heptyl (meth)acrylate is still more preferably more than 50% by weight. The lower limit is further preferably 60% by weight, still further preferably 70% by weight, even still further preferably 80% by weight.

The upper limit of the amount of the structural unit derived from n-heptyl (meth)acrylate is not limited. The upper limit is preferably 99% by weight, more preferably 97% by weight. In other words, the amount of the structural unit derived from n-heptyl (meth)acrylate in the acrylic copolymer is preferably 48% by weight or more and 99% by weight or less.

The amount of the structural unit derived from n-heptyl (meth)acrylate in the acrylic copolymer can be determined by performing mass spectroscopy and $^1$H-NMR measurement of the acrylic copolymer and calculating the amount of the structural unit from the integrated intensity ratio of a peak of hydrogen derived from n-heptyl (meth) acrylate.

The acrylic copolymer preferably further contains a structural unit derived from a monomer containing a crosslinkable functional group.

When the acrylic copolymer contains the structural unit derived from a monomer containing a crosslinkable functional group, the cohesive force of the adhesive layer is increased, which further enhances the adhesion of the adhesive tape particularly at high temperature.

The monomer containing a crosslinkable functional group is not limited, and may be a monomer containing a hydroxy group, a monomer containing a carboxy group, a monomer containing a glycidyl group, a monomer containing an amide group, or a monomer containing a nitrile group, for example. For easy adjustment of the gel fraction of the adhesive layer, a monomer containing a hydroxy group and a monomer containing a carboxy group are preferred, and a monomer containing a hydroxy group is more preferred.

Examples of the monomer containing a hydroxy group include acrylic monomers containing a hydroxy group such as 4-hydroxybutyl (meth)acrylate and 2-hydroxyethyl (meth)acrylate. Examples of the monomer containing a carboxy group include acrylic monomers containing a carboxy group such as (meth)acrylic acid. Examples of the monomer containing a glycidyl group include acrylic monomers containing a glycidyl group such as glycidyl (meth) acrylate. Examples of the monomer containing an amide group include acrylic monomers containing an amide group such as hydroxyethyl (meth)acrylamide, isopropyl (meth) acrylamide, and dimethylaminopropyl (meth)acrylamide. Examples of the monomer containing a nitrile group include acrylic monomers containing a nitrile group such as (meth) acrylonitrile.

These monomers containing a crosslinkable functional group may be used alone or in combination of two or more thereof.

The amount of the structural unit derived from a monomer containing a crosslinkable functional group in the acrylic copolymer is not limited. The lower limit thereof is preferably 0.01% by weight, and the upper limit thereof is preferably 20% by weight. When the amount of the structural unit derived from a monomer containing a crosslinkable functional group is within the range, the adhesive tape has higher adhesion particularly at high temperature. The lower limit of the amount of the structural unit derived from a monomer containing a crosslinkable functional group is more preferably 0.1% by weight, and the upper limit thereof is more preferably 10% by weight. The lower limit is still more preferably 0.5% by weight, and the upper limit is still more preferably 5% by weight.

When the acrylic copolymer contains particularly the structural unit derived from a monomer containing a hydroxy group among structural units derived from a monomer containing a crosslinkable functional group, the amount of the structural unit derived from a monomer containing a hydroxy group in the acrylic copolymer is not limited. The lower limit thereof is preferably 0.01% by weight, and the upper limit thereof is preferably 20% by weight. When the amount of the structural unit derived from a monomer containing a hydroxy group is within the range, the adhesive tape has higher adhesion particularly at high temperature. The lower limit of the amount of the structural unit derived from a monomer containing a hydroxy group is more preferably 0.1% by weight, and the upper limit thereof is more preferably 10% by weight. The lower limit is still more preferably 0.5% by weight, and the upper limit is still more preferably 5% by weight.

The amount of the structural unit derived from a monomer containing a crosslinkable functional group in the acrylic copolymer can be determined by performing mass spectroscopy and $^1$H-NMR measurement of the acrylic copolymer and calculating the amount of the structural unit from the integrated intensity ratio of peaks of hydrogen derived from each monomer.

The acrylic copolymer may contain a structural unit derived from a different monomer other than the structural unit derived from n-heptyl (meth)acrylate and the structural unit derived from a monomer containing a crosslinkable functional group.

The different monomer is not limited. Examples thereof include alkyl (meth)acrylates other than n-heptyl (meth) acrylate.

Examples of the alkyl (meth)acrylates include methyl (meth)acrylate, ethyl (meth)acrylate, propyl (meth)acrylate, n-butyl (meth)acrylate, tert-butyl (meth)acrylate, 2-ethylhexyl (meth)acrylate, n-octyl (meth)acrylate, isooctyl (meth) acrylate, n-nonyl (meth)acrylate, isononyl (meth) acrylate, myristyl (meth)acrylate, cetyl (meth)acrylate, stearyl (meth)acrylate, an ester of 5,7,7-trimethyl-2-(1,3,3-trimethylbutyl)octanol-1 and (meth)acrylic acid, an ester of (meth)acrylic acid and an alcohol having one or two methyl groups in a linear main chain and having a total carbon number of 18, behenyl (meth)acrylate, and arachidyl (meth) acrylate. These alkyl (meth)acrylates may be used alone or in combination of two or more thereof.

Examples of the different monomer also include cyclohexyl (meth)acrylate, isobornyl (meth)acrylate, benzyl (meth)acrylate, 2-butoxyethyl (meth)acrylate, 2-phenoxyethyl (meth) acrylate, tetrahydrofurfuryl (meth)acrylate, and polypropylene glycol mono(meth)acrylate. Examples of the different monomer also include various monomers used for common acrylic polymers, such as vinyl carboxylate (e.g., vinyl acetate) and styrene. These different monomers may be used alone or in combination of two or more thereof.

The acrylic copolymer may contain a structural unit derived from a (meth)acrylate containing an alkyl group having a carbon number of 8 or greater.

The (meth)acrylate containing an alkyl group having a carbon number of 8 or greater is not limited. Examples of such a (meth)acrylate among the above-mentioned (meth) acrylates include 2-ethylhexyl (meth)acrylate, n-octyl (meth)acrylate, isooctyl (meth)acrylate, n-nonyl (meth)acrylate, isononyl (meth)acrylate, myristyl (meth)acrylate, cetyl (meth)acrylate, stearyl (meth)acrylate, an ester of 5,7,7-trimethyl-2-(1,3,3-trimethylbutyl)octanol-1 and (meth) acrylic acid, an ester of (meth)acrylic acid and an alcohol having one or two methyl groups in a linear main chain and having a total carbon number of 18, behenyl (meth)acrylate, and arachidyl (meth) acrylate.

The amount of the structural unit derived from a (meth) acrylate containing an alkyl group having a carbon number of 8 or greater in the acrylic copolymer is not limited. The upper limit thereof is preferably 50% by weight. When the amount of the structural unit derived from a (meth)acrylate containing an alkyl group having a carbon number of 8 or greater is 50% by weight or less, the adhesive tape has higher adhesion particularly at high temperature. The upper limit of the amount of the structural unit derived from a (meth)acrylate containing an alkyl group having a carbon number of 8 or greater is more preferably 48.5% by weight, still more preferably 40% by weight, further preferably 30% by weight.

The lower limit of the amount of the structural unit derived from a (meth)acrylate containing an alkyl group having a carbon number of 8 or greater is not limited, and may be 0% by weight. When the acrylic copolymer contains the structural unit derived from a (meth)acrylate containing an alkyl group having a carbon number of 8 or greater, the lower limit of the amount of the structural unit is preferably 1% by weight, more preferably 5% by weight.

The amount of the structural unit derived from a (meth) acrylate containing an alkyl group having a carbon number of 8 or greater in the acrylic copolymer also can be determined by performing mass spectroscopy and $^1$H-NMR measurement of the acrylic copolymer and calculating the amount of the structural unit from the integrated intensity ratio of peaks of hydrogen derived from each monomer.

The acrylic copolymer may contain a structural unit derived from a monomer having a glass transition temperature (Tg) of −35° C. or higher.

When the acrylic copolymer contains the structural unit derived from a monomer having a glass transition temperature (Tg) of −35° C. or higher, the adhesive layer has higher adhesion. The monomer having a glass transition temperature (Tg) of −35° C. or higher herein refers to a monomer whose homopolymer has a glass transition temperature (Tg) of −35° C. or higher. The glass transition temperature (Tg) of the homopolymer can be determined by differential scanning calorimetry, for example.

The glass transition temperature (Tg) of the monomer having a glass transition temperature (Tg) of −35° C. or higher is more preferably −15° C. or higher. The upper limit of the glass transition temperature (Tg) is not limited. The upper limit is preferably 180° C., more preferably 150° C.

The monomer having a glass transition temperature (Tg) of −35° C. or higher is not limited, but is preferably a monomer not containing a crosslinkable functional group. Specific examples thereof include methyl (meth)acrylate, ethyl (meth)acrylate, isopropyl (meth)acrylate, tert-butyl (meth)acrylate, n-butyl methacrylate, isobutyl (meth) acrylate, isobornyl (meth) acrylate, tetrahydrofurfuryl (meth) acrylate, trimethylolpropane formal (meth)acrylate, cyclohexyl (meth)acrylate, benzyl (meth) acrylate, phenoxyethyl (meth)acrylate, acrylamide, dimethylacrylamide, and diethylacrylamide. Preferred among these are isobornyl (meth)acrylate and tetrahydrofurfuryl (meth) acrylate.

The amount of the structural unit derived from a monomer having a glass transition temperature (Tg) of −35° C. or higher in the acrylic copolymer is not limited. The amount is preferably 5% by weight or more and 70% by weight or less. When the amount of the structural unit derived from a monomer having a glass transition temperature (Tg) of −35° C. or higher is 70% by weight or less, the adhesive layer has higher conformability to irregularities. The upper limit of the amount of the structural unit derived from a monomer having a glass transition temperature (Tg) of −35° C. or higher is more preferably 65% by weight, still more preferably 60% by weight, further preferably 55% by weight, particularly preferably 50% by weight.

When the acrylic copolymer contains the structural unit derived from a monomer having a glass transition temperature (Tg) of −35° C. or higher, the lower limit of the amount thereof is preferably 5% by weight, more preferably 10% by weight.

The amount of the structural unit derived from a monomer having a glass transition temperature (Tg) of −35° C. or higher in the acrylic copolymer also can be determined by performing mass spectroscopy and $^1$H-NMR measurement of the acrylic copolymer and calculating the amount of the structural unit from the integrated intensity ratio of peaks of hydrogen derived from each monomer.

The acrylic copolymer preferably contains a structural unit derived from a monomer having a cyclic structure.

When the acrylic copolymer contains the structural unit derived from a monomer having a cyclic structure, the adhesive tape can be suitably used as an optical adhesive tape.

The cyclic structure is not limited. Examples thereof include alicyclic structures, aromatic ring structures, and heterocyclic structures. Examples of monomers having a cyclic structure among the above-described monomers include isobornyl (meth)acrylate, tetrahydrofurfuryl (meth) acrylate, trimethylolpropane formal (meth)acrylate, cyclohexyl (meth)acrylate, benzyl (meth)acrylate, and phenoxyethyl (meth)acrylate. Preferred among these are isobornyl (meth)acrylate, tetrahydrofurfuryl (meth)acrylate, and trimethylol propane formal (meth)acrylate. Bio-derived monomers are particularly preferred. Bio-derived isobornyl (meth) acrylate, bio-derived tetrahydrofurfuryl (meth)acrylate, and bio-derived trimethylol propane formal (meth) acrylate are more preferred.

The monomer containing a crosslinkable functional group and the different monomer each preferably contain a bio-derived monomer, but may consist of a petroleum-derived monomer.

Theoretically, all the acrylic monomers constituting the acrylic copolymer may be bio-derived. From the viewpoint of the cost and production efficiency of the adhesive tape, a comparatively inexpensive, easily available bio-derived monomer may be used, and this monomer may be used in combination with a petroleum-derived monomer.

The glass transition temperature (Tg) of the acrylic copolymer is not limited. The glass transition temperature (Tg) is preferably −20° C. or lower. When the acrylic copolymer has a glass transition temperature (Tg) of −20° C. or lower, the conformability of the adhesive layer to irregularities is improved, leading to higher adhesion of the adhesive tape particularly at high temperature. The glass transition temperature (Tg) of the acrylic copolymer is more preferably −30° C. or lower, still more preferably −40° C. or lower, further preferably −50° C. or lower. The lower limit of the glass transition temperature (Tg) of the acrylic copolymer is not limited, and is usually −90° C. or higher, preferably −80° C. or higher.

The glass transition temperature (Tg) of the acrylic copolymer can be measured by differential scanning calorimetry, for example.

The weight average molecular weight of the acrylic copolymer is not limited. The lower limit thereof is preferably 200,000, and the upper limit thereof is preferably 2,000,000. When the weight average molecular weight of the acrylic copolymer is within the range, the adhesive tape has higher adhesion particularly at high temperature. The lower limit of the weight average molecular weight of the acrylic copolymer is more preferably 400,000, and the upper limit thereof is more preferably 1,800,000. The lower limit is still more preferably 500,000, and the upper limit is still more preferably 1,500,000. When the weight average molecular weight of the acrylic copolymer is 500,000 or greater, the adhesive tape has higher adhesion, particularly higher holding power when the tape is under a load in a shear direction at high temperature.

The weight average molecular weight is a standard polystyrene equivalent weight average molecular weight determined by gel permeation chromatography (GPC) measurement. Specifically, the acrylic copolymer is diluted 50-fold with tetrahydrofuran (THF). The obtained dilution was filtered through a filter (material: polytetrafluoroethylene, pore size: 0.2 μm) to prepare a measurement sample. Next, this measurement sample is fed to a gel permeation chromatograph (produced by Waters, product name "2690 Separation Model" or its equivalent product), and subjected to GPC measurement at a sample flow rate of 1 mL/min and a column temperature of 40° C. The polystyrene equivalent molecular weight of the acrylic copolymer is measured, and this value is used as the weight average molecular weight of the acrylic copolymer.

The acrylic copolymer can be obtained by radical reaction of a monomer mixture as a raw material in the presence of a polymerization initiator.

The method for radical reaction is not limited. Examples of the polymerization method include living radical polymerization and free radical polymerization. Living radical polymerization can produce a copolymer having a more uniform molecular weight and a more uniform composition compared with free radical polymerization, and can reduce formation of low molecular weight components and the like. This increases the cohesive force of the adhesive layer, leading to higher adhesion of the adhesive tape particularly at high temperature.

The polymerization method is not limited and a conventionally known method may be used. Examples thereof include solution polymerization (boiling point polymerization or constant temperature polymerization), UV polymerization, emulsion polymerization, suspension polymerization, and bulk polymerization. Preferred among these are solution polymerization and UV polymerization because these methods enable the adhesive tape to have higher adhesion particularly at high temperature. More preferred is solution polymerization because the resulting acrylic copolymer is easily mixed with a tackifier resin, allowing the adhesive tape to have even higher adhesion particularly at high temperature.

In the case of using solution polymerization as the polymerization method, examples of a reaction solvent include ethyl acetate, toluene, methyl ethyl ketone, dimethyl sulfoxide, ethanol, acetone, and diethyl ether. These reaction solvents may be used alone or in combination of two or more thereof.

The polymerization initiator is not limited. Examples thereof include organic peroxides and azo compounds. Examples of the organic peroxides include 1,1-bis(t-hexylperoxy)-3,3,5-trimethylcyclohexane, t-hexyl peroxypivalate, t-butyl peroxypivalate, 2,5-dimethyl-2,5-bis(2-ethylhexanoylperoxy)hexane, t-hexyl peroxy-2-ethylhexanoate, t-butyl peroxy-2-ethylhexanoate, t-butyl peroxyisobutyrate, t-butyl peroxy-3,5,5-trimethylhexanoate, and t-butyl peroxylaurate. Examples of the azo compounds include azobisisobutyronitrile and azobiscyclohexanecarbonitrile. These polymerization initiators may be used alone or in combination of two or more thereof.

Examples of the polymerization initiator for living radical polymerization include organotellurium polymerization initiators. Any organotellurium polymerization initiator usually used in living radical polymerization may be used. Examples thereof include organotellurium compounds and organotelluride compounds. Here, also in living radical polymerization, an azo compound may be used as a polymerization initiator in addition to the organotellurium polymerization initiator so as to promote the polymerization rate.

The adhesive layer preferably does not contain a surfactant.

When the adhesive layer does not contain a surfactant, the adhesive tape has higher adhesion particularly at high temperature. That the adhesive layer does not contain a surfactant means that the adhesive layer has a surfactant content of 3% by weight or less, preferably 1% by weight or less.

For the adhesive layer not to contain a surfactant, the acrylic copolymer is preferably produced without using a surfactant. For this, solution polymerization or UV polymerization, for example, may be used as the polymerization method for producing the acrylic copolymer.

The surfactant content can be determined by measurement on the adhesive layer using a liquid chromatography mass spectrometer (e.g., NEXCERA produced by Shimadzu Corporation or Exactive produced by Thermo Fisher Scientific), for example. Specifically, a solution of the adhesive layer in ethyl acetate is filtered through a filter (material: polytetrafluoroethylene, pore size: 0.2 μm). The obtained filtrate (about 10 μL) is injected to a liquid chromatography mass spectrometer for analysis under the conditions below. The surfactant content can be determined from the area ratio of a peak corresponding to the surfactant in the adhesive layer. For analysis, samples in which the adhesive layer has a known surfactant content are preferably prepared for each type of surfactant to form calibration curves showing the relation between the surfactant content and the peak area ratio.

Column: Hypersil GOLD (2.1×150 mm) produced by Thermo
Fisher Scientific
Mobile phase: acetonitrile
Column temperature: 40° C.
Flow rate: 1.0 mL/min
Ionization method: ESI
Capillary temperature: 350° C.

The adhesive layer preferably further contains a crosslinking agent so as to appropriately adjust the gel fraction.

The crosslinking agent is not limited. Examples thereof include isocyanate crosslinking agents, aziridine crosslinking agents, epoxy crosslinking agents, and metal chelate crosslinking agents. Preferred among these are isocyanate crosslinking agents because they enable the adhesive layer to have excellent adhesiveness to adherends.

The molecular weight of the crosslinking agent is not limited. From the viewpoint of production, the molecular weight is preferably less than 2,000 and 100 or greater.

The amount of the crosslinking agent is not limited. The lower limit thereof relative to 100 parts by weight of the acrylic copolymer is preferably 0.05 parts by weight, and the upper limit thereof is preferably 7 parts by weight. When the amount of the crosslinking agent is within the range, the gel fraction of the adhesive layer can be appropriately adjusted, allowing the adhesive tape to be more easily peelable while having higher adhesion particularly at high temperature. The lower limit of the amount of the crosslinking agent is more preferably 0.1 parts by weight, and the upper limit thereof is more preferably 5 parts by weight.

Here, the amount of the crosslinking agent refers to the amount of the solids of the crosslinking agent.

The adhesive layer preferably further contains a tackifier resin. When the adhesive layer contains a tackifier resin, the adhesive tape has higher adhesion particularly at high temperature.

The tackifier resin is not limited. Examples thereof include rosin ester tackifier resins, terpene tackifier resins, coumarone indene tackifier resins, alicyclic saturated hydrocarbon tackifier resins, C5 petroleum tackifier resins, C9 petroleum tackifier resins, and C5-C9 copolymerized petroleum tackifier resins. These tackifier resins may be used alone or in combination of two or more thereof. In particular, the tackifier resin is preferably at least one selected from the group consisting of rosin ester tackifier resins and terpene tackifier resins.

Examples of the rosin ester tackifier resins include polymerized rosin ester resins and hydrogenated rosin ester resins. Examples of the terpene tackifier resins include terpene resins and terpene phenol resins.

The rosin ester tackifier resin and the terpene tackifier resin are preferably bio-derived. Examples of bio-derived rosin ester tackifier resins include rosin ester tackifier resins derived from natural resins such as pine resin. Examples of bio-derived terpene tackifier resins include terpene tackifier resins derived from plant essential oils.

The amount of the tackifier resin is not limited. The lower limit thereof relative to 100 parts by weight of the acrylic copolymer is preferably 10 parts by weight, and the upper limit thereof is preferably 60 parts by weight. When the amount of the tackifier resin is within the range, the adhesive tape has higher adhesion particularly at high temperature. The lower limit of the amount of the tackifier resin is more preferably 15 parts by weight, and the upper limit thereof is more preferably 50 parts by weight, still more preferably 35 parts by weight.

The adhesive layer may contain an additive such as a silane coupling agent, a plasticizer, a softener, a filler, a pigment, or a dye, as needed.

The adhesive layer preferably has a bio-derived carbon content of 10% by weight or more. A bio-derived carbon content of 10% by weight or more is an indicator of a "bio-based product". The bio-derived carbon content of 10% by weight or more is preferred for saving petroleum resources or reducing carbon dioxide emissions. The lower limit of the bio-derived carbon content is more preferably 40% by weight or more, still more preferably 60% by weight. The upper limit of the bio-derived carbon content is not limited, and may be 100% by weight.

While bio-derived carbon contains a certain proportion of radioisotope (C-14), petroleum-derived carbon hardly contains C-14. Thus, the bio-derived carbon content can be calculated by measuring the C-14 concentration in the adhesive layer. Specifically, the bio-derived carbon content can be measured in conformity with ASTM D6866-20, a standard widely used in the bioplastics industry.

The gel fraction of the adhesive layer is not limited. The lower limit thereof is preferably 5% by weight, and the upper limit thereof is preferably 70% by weight.

Achieving easy peelability typically requires increasing the gel fraction of the adhesive layer. In contrast, the adhesive tape of the present invention achieves easy peelability owing to the adhesive layer containing the compound having a structure represented by the formula (A) or (B) in an amount within the above range. The gel fraction of the adhesive layer thus can be adjusted to be relatively low, so that the adhesion at high temperature is less likely to decrease. The gel fraction within the above range allows the adhesive tape to be more easily peelable while having higher adhesion particularly at high temperature. The lower limit of the gel fraction is more preferably 10% by weight, and the upper limit thereof is more preferably 60% by weight.

The gel fraction is measured as follows.

The adhesive tape is cut to a 20 mm×40 mm flat rectangular shape to prepare a specimen. The specimen is immersed in ethyl acetate at 23° C. for 24 hours, then taken out of the ethyl acetate, and dried at 110° C. for 1 hour. The weight of the specimen after drying is measured, and the gel fraction is calculated by the following equation (1). The specimen includes no release film for protecting the adhesive layer.

$$\text{Gel fraction (\% by weight)} = 100 \times (W_2 - W_0)/(W_1 - W_0) \quad (1)$$

($W_0$: the weight of the substrate (PET film), $W_1$: the weight of the specimen before immersion, $W_2$: the weight of the specimen after immersion and drying)

The thickness of the adhesive layer is not limited. The lower limit thereof is preferably 3 µm, and the upper limit thereof is preferably 300 µm. When the thickness of the adhesive layer is within the above range, the adhesive tape is more easily peelable while having higher adhesion particularly at high temperature. The lower limit of the thickness of the adhesive layer is more preferably 5 µm, still more preferably 10 µm. The upper limit of the thickness of the adhesive layer is more preferably 200 µm, still more preferably 100 µm.

The adhesive tape of the present invention may be a non-support tape including no substrate, a one-sided adhesive tape including the adhesive layer on one surface of a substrate, or a double-sided adhesive tape including the adhesive layers on both surfaces of a substrate.

The substrate is not limited, and may be a conventionally known substrate. To increase the bio-derived material content of the adhesive tape as a whole, a bio-derived substrate is preferably used.

Examples of the bio-derived substrate include films and nonwoven fabrics containing polyesters (PES) such as plant-derived polyethylene terephthalate (PET), plant-derived polyethylene furanoate (PEF), plant-derived polylactic acid (PLA), plant-derived polytrimethylene terephthalate (PTT), plant-derived polybutylene terephthalate (PBT), and plant-derived polybutylene succinate (PBS). Examples also include films and nonwoven fabrics containing plant-derived polyethylene (PE), plant-derived polypropylene (PP), plant-derived polyurethane (PU), plant-derived triacetylcellulose (TAC), plant-derived cellulose, and plant-derived polyamide (PA).

From the viewpoint of substrate strength, the substrate is preferably a film containing PES or a film containing PA. From the viewpoint of heat resistance and oil resistance, the substrate is preferably a film containing PA.

Examples of the constituent of the film containing PA include nylon 11, nylon 1010, nylon 610, nylon 510, and nylon 410, which are made from castor oil, and nylon 56, which is made from cellulose.

To use less new petroleum resources and emit less carbon dioxide to reduce environmental load, the substrate may contain recycled resources. The method for recycling resources may involve, for example, collecting waste of packaging containers, home appliances, automobiles, building materials, or food, or waste generated during production processes, and subjecting the recovered material to washing, decontamination, or decomposition by heating or fermentation for reuse as a raw material. Examples of the substrate containing recycled resources include films and non-woven fabrics containing PET, PBT, PE, PP, PA, or the like made from resin recycled from collected plastic. The collected waste may be burned to utilize the heat energy in production of the substrate or raw materials thereof. Fats and oils contained in the collected waste may be added to petroleum, and the fractionated or refined products thereof may be used as raw materials.

The substrate may be a foam substrate to improve compression characteristics.

The foam substrate preferably contains PE, PP and/or PU. To achieve both high flexibility and high strength, the foam substrate more preferably contains PE. Examples of the constituent of the foam substrate containing PE include PE made from sugarcane.

The foam substrate may be produced by any method. A preferred method includes preparing a foamable resin composition containing a foaming agent and a PE resin containing PE made from sugarcane, foaming the foaming agent while extruding the foamable resin composition into a sheet using an extruder, and optionally crosslinking the obtained polyolefin foam.

The thickness of the foam substrate is not limited. The lower limit thereof is preferably 50 μm and the upper limit thereof is preferably 1,000 μm. When the thickness of the foam substrate is within this range, the adhesive tape can exhibit high shock resistance while exhibiting high flexibility to closely fit the shape of an adherend in bonding. The upper limit of the thickness of the foam substrate is more preferably 300 μm.

The lower limit of the total thickness of the adhesive tape of the present invention (total thickness of the substrate and the adhesive layer(s)) is preferably 3 μm, and the upper limit thereof is preferably 1,200 μm. When the total thickness of the adhesive tape is within the range, the adhesive tape is more easily peelable while having higher adhesion particularly at high temperature. The upper limit of the total thickness of the adhesive tape of the present invention is more preferably 500 μm.

The adhesive tape of the present invention is easily peelable while capable of maintaining high adhesion at high temperature. The lower limit of the 180° peeling force of the adhesive tape of the present invention for a SUS plate measured in conformity with JIS Z 0237:2009 is preferably 4 N/25 mm, and the upper limit thereof is preferably 20 N/25 mm. The lower limit is more preferably 8 N/25 mm, and the upper limit is more preferably 16 N/25 mm. When the 180° peeling force is 20 N/25 mm or less, the adhesive tape is more easily peeled off in the disassembly or recycle process of electronic devices or the like. Additionally, peeling at the interface between the adhesive tape and an adherend is facilitated when the adhesive tape is peeled off.

The 180° peeling force for a SUS plate is measured in conformity with JIS Z 0237:2009 as follows. First, the adhesive tape is cut to a size of 25 mm wide×75 mm long to prepare a specimen. This specimen is placed on a SUS plate (e.g., SUS304-2B) with the adhesive layer facing the SUS plate. A 2-kg rubber roller is then moved back and forth once on the specimen at a speed of 300 mm/min to bond the specimen and the SUS plate together. The specimen is then left to stand at 23° C. and a humidity of 50% for 20 minutes to prepare a test sample. The adhesive tape and the SUS plate of the test sample are peeled apart in the 180° direction at a tensile speed of 300 mm/min under the conditions of 23° C. and a humidity of 50% in conformity with JIS Z 0237: 2009, and the peeling force (N/25 mm) is measured.

Here, when the adhesive tape is a non-support tape including no substrate or a double-sided adhesive tape having adhesive layers on both surfaces of a substrate, one adhesive layer surface (the side not to be measured) is backed with a polyethylene terephthalate film having a thickness of 23 μm (e.g., FE2002 produced by Futamura Chemical Co., Ltd. or its equivalent product), and then the adhesive tape is bonded to the SUS plate.

The adhesive tape of the present invention may be produced by any method, and may be produced by a conventionally known production method. For example, a double-sided adhesive tape including a substrate may be produced by the following method.

First, a solution of an adhesive A is prepared by adding a solvent to the acrylic copolymer, the compound having a structure represented by the formula (A) or (B), and optional materials such as the crosslinking agent and the tackifier resin. The solution of an adhesive A is applied to a surface of the substrate, and the solvent in the solution is completely removed by drying to form an adhesive layer A. Next, a release film is placed on the formed adhesive layer A such that the release-treated surface of the release film faces the adhesive layer A.

Then, another release film is provided. A solution of an adhesive B prepared in the same manner as above is applied to the release-treated surface of the release film. The solvent in the solution is completely removed by drying. This produces a laminated film including an adhesive layer B formed on a surface of the release film. The obtained laminated film is placed on the rear surface of the substrate on which the adhesive layer A is formed, such that the adhesive layer B faces the rear surface of the substrate. Thus, a laminate is produced. The laminate is pressurized using a rubber roller or the like. This can produce a double-sided adhesive tape in which adhesive layers are on both surfaces of a substrate and release films cover the surfaces of the adhesive layers.

Alternatively, two laminated films may be produced in the same manner as above, and the laminated films may be placed on both surfaces of the substrate such that the adhesive layer of each laminated film faces the substrate. The resulting laminate may be pressurized using a rubber roller or the like. This can produce a double-sided adhesive tape in which adhesive layers are on both surfaces of a substrate and release films cover the surfaces of the adhesive layers.

Alternatively, an adhesive solution prepared in the same manner as above may be applied to the release-treated side of a release film. The solvent in the solution may be completely removed by drying to form an adhesive layer, and then this adhesive layer may be placed on the release-treated side of a release film. This can produce a non-support tape including no substrate.

With the method for producing the adhesive tape of the present invention, any method may be used to prepare the adhesive solution by adding the solvent to the acrylic copolymer, the compound having a structure represented by the formula (A) or (B), and optional ingredients such as the crosslinking agent and the tackifier resin. The components may be each separately produced and then mixed.

Here, when the acrylic copolymer contains the above structural unit derived from n-heptyl acrylate, the compound having a structure represented by the formula (A) or (B) may be added at the stage of a monomer mixture as a raw material before the production of the acrylic copolymer.

Specifically, when the acrylic copolymer contains the structural unit derived from n-heptyl acrylate, n-heptyl acrylate is prepared by esterifying n-heptyl alcohol with acrylic acid. At this time, further addition reaction of n-heptyl alcohol to the obtained n-heptyl acrylate may produce the compound having a structure represented by the formula (A) or (B). This mixture of n-heptyl acrylate and the compound having a structure represented by the formula (A) or (B) may be added to the monomer mixture as a raw material of the acrylic copolymer, whereby the compound having a structure represented by the formula (A) or (B) can be added at the stage of the monomer mixture as a raw material before production of the acrylic copolymer. The amount of the compound having a structure represented by the formula (A) or (B) in the monomer mixture can be calculated from a mass spectrum obtained by GC/MS measurement of a solution obtained by diluting the sol component of the adhesive layer. Specifically, the amount can be calculated by determining the area ratio of a peak derived from the compound having a structure represented by the formula (A) or (B) and a peak derived from the acrylic copolymer in the obtained mass spectrum.

The adhesive tape of the present invention may be used in any application. As the adhesive tape is easily peelable while capable of maintaining high adhesion at high temperature, the adhesive tape is preferably used for fixing an electronic device component or an in-vehicle device component. Specifically, for example, the adhesive tape of the present invention can be suitably used to bond and fix an electronic device component in a large portable electronic device or bond and fix an in-vehicle device component (e.g., in-vehicle panel).

The present invention also encompasses a method for fixing an electronic device component or an in-vehicle device component including fixing an electronic device component or an in-vehicle device component using the adhesive tape of the present invention. The present invention also encompasses a method for producing an electronic device or an in-vehicle device including the method for fixing an electronic device component or an in-vehicle device component of the present invention. These methods enable firm fixing of an electronic device component or an in-vehicle device component while enabling easy peeling of the adhesive tape in recycling (disassembling) an electronic device or an in-vehicle device.

Advantageous Effects of Invention

The present invention can provide an adhesive tape that is easily peelable while capable of maintaining high adhesion at high temperature. The present invention can also provide a method for fixing an electronic device component or an in-vehicle device component using the adhesive tape and a method for producing an electronic device or an in-vehicle device.

BRIEF DESCRIPTION OF DRAWINGS

FIG. 1 is a schematic view illustrating a repulsion resistance test on an adhesive tape.

DESCRIPTION OF EMBODIMENTS

The embodiments of the present invention are more specifically described in the following with reference to examples. These examples are not intended to limit the present invention.

Example 1

(1) Production of Acrylic Copolymer

Ethyl acetate as a polymerization solvent was added into a reaction vessel and bubbled with nitrogen. Subsequently, with nitrogen flowing into the reaction vessel, the reaction vessel was heated to start reflux. A polymerization initiator solution obtained by diluting 0.1 parts by weight of azobisisobutyronitrile as a polymerization initiator 10-fold with ethyl acetate was added into the reaction vessel. Subsequently, 50 parts by weight of n-butyl acrylate (BA, produced by Mitsubishi Chemical Corporation), 44.9 parts by weight of 2-ethylhexyl acrylate (2-EHA, produced by Mitsubishi Chemical Corporation), 5 parts by weight of acrylic acid (AAc, produced by Nippon Shokubai Co., Ltd.), and 0.1 parts by weight of 2-hydroxyethyl acrylate (2-HEA, produced by Osaka Organic Chemical Industry Ltd.) were dripped over two hours. After dripping was complete, the polymerization initiator solution obtained by diluting 0.1 parts by weight of azobisisobutyronitrile as a polymerization initiator 10-fold with ethyl acetate was added into the reaction vessel again. Polymerization reaction was performed for four hours to give a solution containing an acrylic copolymer.

The obtained acrylic copolymer was diluted 50-fold with tetrahydrofuran (THF). The obtained dilution was filtered through a filter (material: polytetrafluoroethylene, pore size: 0.2 μm) to prepare a measurement sample. This measurement sample was fed to a gel permeation chromatograph (produced by Waters Corporation, 2690 Separations Model) and subjected to GPC measurement at a sample flow rate of 1 mL/min and a column temperature of 40° C. to measure the polystyrene equivalent molecular weight of the acrylic copolymer. Thus, the weight average molecular weight was determined.

(2) Production of Compound Having Structure Represented by Formula (A) or (B)

n-Heptyl acrylate, n-heptyl alcohol, and sulfuric acid were mixed at a ratio by mole of 2:1:0.2 and reacted at 110° C. (addition reaction). The reaction product was distilled to give a compound having a structure represented by the formula (A) or (B).

(3) Production of Adhesive Tape

An isocyanate crosslinking agent (produced by Tosoh Corporation, CoronateL-45) was added to the obtained solution containing the acrylic copolymer such that the amount of the solids of the crosslinking agent was 0.5 parts by weight relative to 100 parts by weight of the acrylic copolymer. Further, 0.5 parts by weight of the obtained compound having a structure represented by the formula (A) or (B) was added, whereby an adhesive solution was prepared. The adhesive solution was applied to the release-treated surface of a release-treated PET film having a thickness of 75 μm such that the adhesive layer after drying would have a thickness of 50 μm, and then dried at 110° C. for five minutes. This adhesive layer was placed on the release-treated surface of a release-treated PET film having a thickness of 75 μm and left to stand at 40° C. for 48 hours, whereby an adhesive tape (non-support type) was obtained.

(4) Measurement of Gel Fraction of Adhesive Layer

The release film on one surface of the obtained adhesive tape was removed. The adhesive tape was attached to a PET film having a thickness of 23 μm (produced by Futamura Chemical Co., Ltd., FE2002) and cut to a 20 mm×40 mm flat rectangular shape. The release film on the other surface of the adhesive tape was removed, whereby a specimen was prepared. The weight of the specimen was measured. The specimen was immersed in ethyl acetate at 23° C. for 24 hours, taken out of the ethyl acetate, and dried at 110° C. for 1 hour. The weight of the specimen after drying was measured, and the gel fraction was calculated by the following equation (1).

$$\text{Gel fraction (\% by weight)} = 100 \times (W_2 - W_0)/(W_1 - W_0) \qquad (1)$$

($W_0$: the weight of the substrate (PET film), $W_1$: the weight of the specimen before immersion, $W_2$: the weight of the specimen after immersion and drying)

Examples 2 to 14 and Comparative Examples 1 to 4

An adhesive tape was obtained as in Example 1 except that the type and compounding amount of the acrylic monomers constituting the acrylic copolymer, the weight average molecular weight of the acrylic copolymer, the amount of the compound having a structure represented by the formula (A) or (B), and the compounding amount and type of the tackifier resins and the crosslinking agents were changed as shown in Table 1.

In Examples 3 to 14 and Comparative Examples 2 to 4, n-heptyl acrylate (C7) was used that was prepared by esterifying n-heptyl alcohol (produced by Tokyo Chemical Industry Co., Ltd.) with acrylic acid (AAc, produced by Nippon Shokubai Co., Ltd.).

In Examples 2, 4 to 7, and 9 and Comparative Examples 1 to 4, 10 parts by weight of a terpene phenolic resin A, 10 parts by weight of a polymerized rosin ester resin B, and 10 parts by weight of a hydrogenated rosin ester resin C were used as tackifier resins. The tackifier resins used were the following bio-derived tackifier resins.

Terpene phenolic resin A (produced by Yasuhara Chemical Co., Ltd., G150, softening point: 150° C., bio-derived carbon content 67% by weight)

Polymerized rosin ester resin B (hydroxy value: 46, softening point: 152° C., bio-derived carbon content 95% by weight)

Hydrogenated rosin ester resin C (produced by Arakawa Chemical Industries Ltd., KE359, hydroxy value: 40, softening point: 100° C., bio-derived carbon content 95% by weight)

Examples 15 and 16

An adhesive tape was obtained as in Example 3 except that the weight average molecular weight of the acrylic copolymer was changed as shown in Table 2.
<Evaluation>
The adhesive tapes obtained in the examples and the comparative examples were evaluated by the following methods. Tables 1 and 2 show the results.
(1) Easy Peelability (Peeling Force for SUS Plate)
The 180° peeling force of each adhesive tape for a SUS plate was measured in conformity with JIS Z 0237:2009.

Specifically, first, one surface (the side not to be measured) of the adhesive tape was backed with a polyethylene terephthalate film having a thickness of 23 μm (produced by Futamura Chemical Co., Ltd., FE2002). The adhesive tape was then cut to a size of 25 mm wide×75 mm long to prepare a specimen. This specimen was placed on a SUS plate (SUS304-2B) with the adhesive layer (the side to be measured) facing the SUS plate. A 2-kg rubber roller was then moved back and forth once on the specimen at a speed of 300 mm/min to bond the specimen to the SUS plate. The specimen was then left to stand for 20 minutes at 23° C. and a humidity of 50%. Thus, a test sample was produced. The adhesive tape and the SUS plate of the test sample were peeled apart in the 180° direction at a tensile speed of 300 mm/min under the conditions of 23° C. and a humidity of 50% in conformity with JIS Z 0237:2009, and the peeling force (N/25 mm) was measured.

The easy peelability was evaluated as "○" (Good) when the peeling force for the SUS plate was 4 N/25 mm or greater and 20 N/25 mm or less. The easy peelability was evaluated as "×" (Poor) when the peeling force was less than 4 N/25 mm or greater than 20 N/25 mm.
(2) Adhesion at High Temperature (Repulsion Resistance Test)
FIG. 1 is a schematic view illustrating a repulsion resistance test of an adhesive tape.

As shown in FIG. 1, an adhesive tape 9 was cut to a flat rectangular shape (25 mm wide×150 mm long). The adhesive tape 9 was used to bond an aluminum plate 10 (25 mm wide×150 mm long×0.3 mm thick) and a polycarbonate resin plate 11 (25 mm wide×200 mm long×1 mm thick). The position of the adhesive tape 9 was adjusted to the central part of the polycarbonate resin plate 11 in the longitudinal direction. A 2-kg rubber roller was moved back and forth once on the polycarbonate resin plate 11 at a speed of 300 mm/min to integrate the polycarbonate resin plate 11 and the aluminum plate 10 via the adhesive tape 9. The workpiece was left to stand at 23° C. for 24 hours, whereby a test sample 12 was produced. The test sample 12 was set on a fixture 13 as shown in FIG. 1. Bending stress was applied in the vertical direction of the test sample 12 to deform the test sample 12 into an arc-like curved state such that the distance between the ends of the polycarbonate resin plate 11 in the longitudinal direction was 180 mm. The test sample 12 in this state was placed in an oven at 85° C. and left to stand for 24 hours. The test sample 12 in the arc-like curved state was taken out of the oven, and a height H (mm) of partial detachment between the aluminum plate 10 and the polycarbonate resin plate 11 was measured with a caliper.

The adhesion at high temperature was evaluated as "○" (Good) when the height H of the partial detachment in the repulsion resistance test was 8 mm or less. The adhesion at high temperature was evaluated as "×" (Poor) when the height H of the partial detachment was greater than 8 mm.
(3) Shear Holding Power at High Temperature
The holding power of the adhesive tapes according to Examples 3, 15, and 16 was measured. Table 2 shows the results. The shear holding power of each adhesive tape at high temperature was measured in conformity with JIS Z 0237:2009.

Specifically, first, one surface (the side not to be measured) of the adhesive tape was backed with a polyethylene terephthalate film (produced by Futamura Chemical Co., Ltd., FE2002) having a thickness of 23 μm. The adhesive tape was then cut to a size of 25 mm wide×75 mm long to prepare a specimen. This specimen was placed on a SUS304-2B plate (2 mm thick, 50 mm wide, and 80 mm long) with the adhesive layer (the side to be measured) facing the SUS304-2B plate. Then, a 2-kg rubber roller was moved back and forth once on the specimen at a speed of 300 mm/min to bond the specimen to the SUS304-2B plate. The specimen was then left to stand for 20 minutes at 23° C. and a humidity of 50%. Thus, a test sample was produced. This test sample was placed in an environment at 80° C. and a humidity of 50% and left to stand for 15 minutes. A 1-kg weight was then attached to the polyethylene terephthalate film of the test sample such that a load in a shear direction was applied in conformity with JIS Z 0237:2009. One hour after the weight was attached, the amount of slippage of the adhesive layer in the shear direction from the position where it was bonded to the SUS304-2B plate was measured.

The shear holding power at high temperature was evaluated as "○" (Good) when the amount of slippage was less than 0.5 mm. The shear holding power at high temperature was evaluated as "Δ" (Fair) when the amount of slippage was 0.5 mm or greater.

TABLE 1

| | | | Example | | | | | | | | | |
| --- | --- | --- | --- | --- | --- | --- | --- | --- | --- | --- | --- | --- |
| | | | 1 | 2 | 3 | 4 | 5 | 6 | 7 | 8 | 9 | 10 |
| Adhesive layer | Acrylic copolymer [parts by weight] | n-Butyl acrylate (BA) | 50 | 50 | — | — | — | — | — | 64.9 | 64.9 | 44.9 |
| | | 2-Ethylhexyl acrylate (2-EHA) | 44.9 | 44.9 | — | — | — | — | — | — | — | — |
| | | n-Heptyl acrylate (C7) | — | — | 94.9 | 94.9 | 94.9 | 94.9 | 94.7 | 30 | 30 | 50 |
| | | Isobornyl acrylate (IBOA) | — | — | — | — | — | — | — | — | — | — |

TABLE 1-continued

| | | | | | | | | | | | | |
|---|---|---|---|---|---|---|---|---|---|---|---|---|
| | | Acrylic acid (AAc) | 5 | 5 | 5 | 5 | 5 | 5 | 5 | 5 | 5 | 5 |
| | | 2-Hydroxy ethyl acrylate (2-HEA) | 0.1 | 0.1 | 0.1 | 0.1 | 0.1 | 0.1 | 0.3 | 0.1 | 0.1 | 0.1 |
| | | Compound having structure represented by formula (A) or (B) [parts by weight] | 0.5 | 0.5 | 0.5 | 0.01 | 0.5 | 10 | 0.5 | 0.5 | 0.5 | 0.5 |
| | | Tackifier resin (TF) [parts by weight] | | 30 | — | 30 | 30 | 30 | 30 | — | 30 | — |
| | | Crosslinking agent [parts by weight] | 0.5 | 1.5 | 0.5 | 1.5 | 1.5 | 1.5 | 1.5 | 0.5 | 1.5 | 0.5 |
| | | Weight average molecular weight of acrylic copolymer (Mw) [× $10^4$] | 100 | 100 | 116 | 116 | 116 | 116 | 62 | 119 | 119 | 120 |
| | | Gel fraction of adhesive layer [% by weight] | 34 | 38 | 35 | 37 | 37 | 35 | 33 | 38 | 39 | 35 |
| Evaluation | Easy peelability | Peeling force for SUS plate (N/25 mm) | 10.5 | 18.5 | 10.2 | 18.0 | 15.6 | 6.4 | 15.2 | 11.7 | 19.0 | 12.1 |
| | | Rating | ○ | ○ | ○ | ○ | ○ | ○ | ○ | ○ | ○ | ○ |
| | Adhesion at high temperature (repulsion resistance test) | Height of partial detatchment (mm) | 4 | 3 | 2 | 0 | 0 | 7 | 5 | 3 | 5 | 3 |
| | | Rating | ○ | ○ | ○ | ○ | ○ | ○ | ○ | ○ | ○ | ○ |

| | | | | | | | Comparative Example | | | |
|---|---|---|---|---|---|---|---|---|---|---|
| | | | 11 | 12 | 13 | 14 | 1 | 2 | 3 | 4 |
| Adhesive layer | Acrylic copolymer [parts by weight] | n-Butyl acrylate (BA) | — | — | — | — | 50 | — | — | — |
| | | 2-Ethylhexyl acrylate (2-EHA) | — | — | — | — | 44.9 | — | — | — |
| | | n-Heptyl acrylate (C7) | 64 | 85 | 75 | 58.9 | — | 94.9 | 94.9 | 94 |
| | | Isobornyl acrylate (IBOA) | 30 | — | — | 40 | — | — | — | — |
| | | Acrylic acid (AAc) | 1 | 5 | 5 | 1 | 5 | 5 | 5 | 5 |
| | | 2-Hydroxy ethyl acrylate (2-HEA) | 5 | 10 | 20 | 0.1 | 0.1 | 0.1 | 0.1 | 1 |
| | Compound having structure represented by formula (A) or (B) [parts by weight] | | 0.5 | 0.5 | 0.5 | 0.5 | — | — | 15 | — |
| | Tackifier resin (TF) [parts by weight] | | — | — | — | — | 30 | 30 | 30 | 30 |
| | Crosslinking agent [parts by weight] | | 0.5 | 0.5 | 0.5 | 0.5 | 1.5 | 1.5 | 1.5 | 1.5 |
| | Weight average molecular weight of acrylic copolymer (Mw) [× $10^4$] | | 102 | 104 | 106 | 108 | 100 | 116 | 116 | 115 |
| | Gel fraction of adhesive layer [% by weight] | | 45 | 51 | 67 | 31 | 38 | 37 | 34 | 75 |
| Evaluation | Easy peelability | Peeling force for SUS plate (N/25 mm) | 13.8 | 9.5 | 8.3 | 15.3 | 21.3 | 20.3 | 3.8 | 8.5 |
| | | Rating | ○ | ○ | ○ | ○ | X | X | X | ○ |
| | Adhesion at high temperature (repulsion resistance test) | Height of partial detatchment (mm) | 4 | 4 | 7 | 2 | 3 | 0 | 10 | 15 |
| | | Rating | ○ | ○ | ○ | ○ | ○ | ○ | X | X |

TABLE 2

| | | | Example | | |
|---|---|---|---|---|---|
| | | | 3 | 15 | 16 |
| Adhesive layer | Acrylic copolymer [parts by weight] | n-Butyl acrylate (BA) | — | — | — |
| | | 2-Ethylhexyl acrylate (2-EHA) | — | — | — |
| | | n-Heptyl acrylate (C7) | 94.9 | 94.9 | 94.9 |
| | | Isobornyl acrylate (IBOA) | — | — | — |
| | | Acrylic acid (AAc) | 5 | 5 | 5 |
| | | 2-Hydroxy ethyl acrylate (2-HEA) | 0.1 | 0.1 | 0.1 |
| | Compound having structure represented by formula (A) or (B) [parts by weight] | | 0.5 | 0.5 | 0.5 |
| | Tackifier resin (TF) [parts by weight] | | — | — | — |
| | Crosslinking agent [parts by weight] | | 0.5 | 0.5 | 0.5 |
| Weight average molecular weight of acrylic copolymer (Mw) [×$10^4$] | | | 116 | 40 | 50 |
| Gel fraction of adhesive layer [% by weight] | | | 35 | 22 | 27 |
| Evaluation | Easy peelability | Peeling force for SUS plate (N/25 mm) | 10.2 | 12.2 | 11.8 |
| | | Rating | ○ | ○ | ○ |

TABLE 2-continued

| | | Example | | |
|---|---|---|---|---|
| | | 3 | 15 | 16 |
| Adhesion at high temperature (repulsion resistance test) | Height of partial detatchment (mm) | 2 | 7 | 5 |
| | Rating | ○ | ○ | ○ |
| Shear holding power at high temperature | Amount of slippage [mm] | 0.1 | 0.6 | 0.3 |
| | Rating | ○ | Δ | ○ |

INDUSTRIAL APPLICABILITY

The present invention can provide an adhesive tape that is easily peelable while capable of maintaining high adhesion at high temperature. The present invention can also provide a method for fixing an electronic device component or an in-vehicle device component using the adhesive tape and a method for producing an electronic device or an in-vehicle device.

REFERENCE SIGNS LIST

9 adhesive tape
10 aluminum plate
11 polycarbonate resin plate
12 test sample
13 fixture

The invention claimed is:

1. An adhesive tape comprising
an adhesive layer containing: an acrylic copolymer; and 0.01 parts by weight or more and 10 parts by weight or less of a compound having a structure represented by the following formula (A) or (B) relative to 100 parts by weight of the acrylic copolymer:

[Chem. 1]

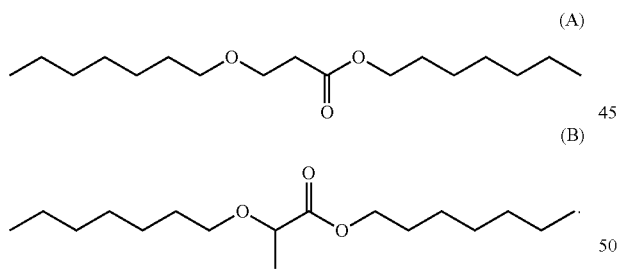

2. The adhesive tape according to claim 1,
wherein the acrylic copolymer contains more than 50% by weight of a structural unit derived from an alkyl (meth)acrylate.

3. The adhesive tape according to claim 1,
wherein the acrylic copolymer contains a structural unit derived from n-heptyl (meth)acrylate.

4. The adhesive tape according to claim 3,
wherein the acrylic copolymer contains 30% by weight or more of the structural unit derived from n-heptyl (meth) acrylate.

5. The adhesive tape according to claim 4,
wherein the acrylic copolymer contains more than 50% by weight of the structural unit derived from n-heptyl (meth)acrylate.

6. The adhesive tape according to claim 1,
wherein in the acrylic copolymer, an amount of a structural unit derived from a (meth)acrylate containing an alkyl group having a carbon number of 8 or greater is 50% by weight or less.

7. The adhesive tape according to claim 1,
wherein the acrylic copolymer further contains a structural unit derived from a monomer containing a crosslinkable functional group.

8. The adhesive tape according to claim 7,
wherein the acrylic copolymer contains 0.01% by weight or more and 20% by weight or less of the structural unit derived from a monomer containing a crosslinkable functional group.

9. The adhesive tape according to claim 7,
wherein the monomer containing a crosslinkable functional group comprises a monomer containing a hydroxy group, and the acrylic copolymer contains 0.01% by weight or more and 20% by weight or less of a structural unit derived from the monomer containing a hydroxy group.

10. The adhesive tape according to claim 1,
wherein the acrylic copolymer has a weight average molecular weight of 200,000 or greater and 2,000,000 or less.

11. The adhesive tape according to claim 1,
wherein the adhesive layer further contains a tackifier resin.

12. The adhesive tape according to claim 1,
wherein the adhesive layer does not contain a surfactant.

13. The adhesive tape according to claim 1,
wherein the adhesive layer has a gel fraction of 10% by weight or more and 70% by weight or less.

14. The adhesive tape according to claim 1,
wherein the adhesive layer has a bio-derived carbon content of 10% by weight or more.

15. The adhesive tape according to claim 1, used for fixing an electronic device component or an in-vehicle device component.

16. A method for fixing an electronic device component or an in-vehicle device component, comprising
fixing an electronic device component or an in-vehicle device component using the adhesive tape according to claim 1.

17. A method for producing an electronic device or an in-vehicle device, comprising
the method for fixing an electronic device component or an in-vehicle device component according to claim 16.

* * * * *